United States Patent
Sarup

(10) Patent No.: US 10,885,705 B2
(45) Date of Patent: Jan. 5, 2021

(54) POINT CLOUD RENDERING ON GPU USING DYNAMIC POINT RETENTION

(71) Applicant: Ideaforge Technology Pvt. Ltd, Maharashtra (IN)

(72) Inventor: Dhirendra Sarup, Maharashtra (IN)

(73) Assignee: IDEAFORGE TECHNOLOGY PVT. LTD., Maharashtra (IN)

( * ) Notice: Subject to any disclaimer, the term of this patent is extended or adjusted under 35 U.S.C. 154(b) by 0 days.

(21) Appl. No.: 16/539,271

(22) Filed: Aug. 13, 2019

(65) Prior Publication Data
US 2020/0058164 A1 Feb. 20, 2020

(30) Foreign Application Priority Data
Aug. 14, 2018 (IN) .............................. 201821030592

(51) Int. Cl.
G06T 17/20 (2006.01)
G06T 15/00 (2011.01)

(52) U.S. Cl.
CPC .............. *G06T 17/20* (2013.01); *G06T 15/00* (2013.01); *G06T 2210/56* (2013.01)

(58) Field of Classification Search
CPC ...... G06T 17/20; G06T 15/00; G06T 2210/56
See application file for complete search history.

(56) References Cited

U.S. PATENT DOCUMENTS

| | | | |
|---|---|---|---|
| 8,947,444 B1* | 2/2015 | Hakura | G06T 1/20 345/522 |
| 2013/0262812 A1* | 10/2013 | Lefebvre | G06F 12/023 711/171 |
| 2019/0333265 A1* | 10/2019 | Kim | H04L 29/06 |

OTHER PUBLICATIONS

Dachsbacher et al., Sequential Point Trees, ACM Transaction on Graphics, vol. 22, Issue 3, Jul. 2003, pp. 657-662. (Year: 2003).*

* cited by examiner

*Primary Examiner* — Haixia Du
(74) *Attorney, Agent, or Firm* — The Jansson Firm; Pehr B. Jansson

(57) ABSTRACT

The present disclosure relates to generating a single vertex list/point-cloud list of an object for rendering the object in different complexity levels. The generated single vertex list comprises a large number of points obtained from external surfaces of the real-time object for detailed 3D representation and the list is updated with new batches of received point cloud vertices. The points are rendered from the single vertex list based on the correlation between zoom level and point retention factor. A scene's zoom/scaling level is altered by changing the distance of a camera to the objects represented by the rendered point cloud.

11 Claims, 7 Drawing Sheets

500

| P0 | P1 | P2 | P3 | P4 | P5 | P6 | P7 | P8 |

| 12 Vertex Data Bytes Starting at Byte Index 0 Read by GPU for Retaining P0 | 24 Vertex Data Bytes Starting at Byte Index 12 Ignored by GPU for Skipping P1, P2 | 12 Vertex Data Bytes Starting at Byte Index 36 Read by GPU for Retaining P3 | 24 Vertex Data Bytes Starting at Byte Index 48 Ignored by GPU for Skipping P4, P5 | 12 Vertex Data Bytes Starting at Byte Index 72 Read by GPU for Retaining P6 | 24 Vertex Data Bytes Starting at Byte Index 84 Ignored by GPU for Skipping P7, P8 |

FIG. 6

POINT CLOUD RENDERING ON GPU USING DYNAMIC POINT RETENTION

TECHNICAL FIELD

The present disclosure relates to the field of three-dimensional geometric rendering using point cloud techniques for computer graphics. More particularly, the present disclosure relates to systems and methods for maintaining a single vertex list for point cloud rendering on a Graphics Processing Unit (GPU) using dynamic point retention.

BACKGROUND

A point cloud is a set of points in a 3D space that represents a model of one or more real world objects. The point clouds are generally rendered using the GPU for real time rendering by making use of point primitives i.e. vertices describing X, Y, Z positions of the points. In most cases, a batch of new point cloud vertices is appended at end of existing list of point vertices at regular intervals by capturing the points using a Light Detection and Ranging (LIDAR) sensor or by reading point data from a file present on a storage device such as disk. FIG. 1 illustrates a conventional technique for a point cloud rendering system. The FIG. 1 illustrates a set of point clouds captured via the LIDAR sensor and read from a file stored on a storage device to be rendered using a point cloud rendering application. The data from the point cloud rendering application is stored in Random Access Memory (RAM) and the application simultaneously interacts with the GPU, a hardware abstraction layer (HAL), and an OpenGL/DirectX application programming interface (API).

As the number of points appended at the end of the vertices list keeps on increasing with time, it becomes difficult to render all point vertices in real time especially using the mid-end onboard GPUs. To make real time rendering possible for allowing the user to interact with the point cloud by applying transformations such as scaling, rotation and translation, it is necessary to control a LOD (Level of Detail) for the rendered point cloud by retaining every $N^{th}$ point for rendering, while skipping the points in between. This must be done in such a manner that the point cloud appears sparser as the distance from the camera (view position) to the objects represented by the rendered point cloud increases, and denser as the distance from the camera (view position) to the objects represented by the rendered point cloud decreases, since the user must be able to see a more detailed view of the objects represented by the point cloud as the distance from the camera to the objects represented by the rendered point cloud keeps on decreasing. The distance from the camera to the objects represented by the rendered point cloud can be controlled by a variety of methods such as:

1) Changing the scene zoom/scaling level (i.e. applying scaling to a world transformation matrix uniformly about X, Y, Z axis).

2) Changing the Z axis position of the rendered scene's center (i.e. applying translation to the world transformation matrix along Z axis).

3) Changing the Z axis position of the camera (i.e. changing the eye's Z axis position while constructing a view transformation matrix).

Existing approaches commonly used for rendering the point cloud using the GPU involves creation of M vertex lists (vertex arrays/vertex buffers) in the GPU memory for each of M zoom levels supported. This is done by allocating an increasing amount of the memory from first to the $M^{th}$ vertex list during initialization such that the first vertex list corresponds to lowest zoom level for representing a sparse point cloud, whereas the $M^{th}$ vertex list corresponds to the highest zoom level for representing a dense point cloud. While appending the points at end of each of the vertex list, an integer based point retention factor is chosen whose value keeps on decreasing from X for the first vertex list to 1 for the $M^{th}$ vertex list such that most number of the points are skipped while updating the first vertex list, and no points are skipped while updating the $M^{th}$ vertex list. While rendering, a correlation between the zoom level and the point retention factor is established to control the LOD such that a vertex list with lesser points is chosen for rendering at a low zoom level, and a vertex list with more points is chosen for rendering at a higher zoom level while preventing rendering of the other vertex lists.

For example, if the application supports 3 types of zoom levels such as low, medium and high, then M=3 vertex lists can be created with increasing amount of the allocated GPU memory. While appending the point vertices at the end of the vertex lists, a point retention factor=10, 5, and 1 respectively can be chosen for the M vertex lists corresponding to the zoom levels mentioned above, such that every $N^{th}$ point that is a multiple of the point retention factor will be copied to the vertex list in the GPU memory. While rendering, the first vertex list can be chosen for scaling <=100% representing low zoom level, the second vertex list can be chosen for scaling <=200% representing medium zoom level, else the last $M^{th}$ vertex list can be chosen for higher scaling representing high zoom level.

This approach suffers from drawbacks such as a) the GPU memory needs to be allocated for each of the M vertex lists, where only the $M^{th}$ vertex list contains all points, whereas the other vertex lists contain a subset of points used in the $M^{th}$ vertex list, b) additional time and processing power is required while copying points to each of the M vertex lists in GPU memory.

Another existing approach available to reduce the amount of memory required for storing some repeated vertices in each of the M vertex lists, requires using a single vertex list containing all points, while maintaining M index lists (element arrays/index buffers) containing integer based vertex indices mapped to the vertices present in the single vertex list, where the first index list contains the least number of vertex indices representing low quality for rendering a sparse scene, whereas the $M^{th}$ index list contains all the vertex indices representing high quality for rendering a dense scene. The points are then rendered using the single vertex list along with one of the selected index lists based on the correlation between the zoom level and point retention factor described in the previous approach.

This approach has various shortcomings, such as a) although the approach reduces the memory requirements as mentioned in the first approach above by using the M index lists instead of the M vertex lists, the memory is still used up for storing the M index lists, b) additional time and processing power is required to store the vertex indices in each of the index lists, and c) rendering the vertices using the index list consumes lesser memory, but may lower the rendering speed slightly as a lookup is required into the index list to get a reference to the vertices from the vertex list to be rendered.

Thus, there is a need to provide a solution to render an object at different complexity levels without generating multiple vertex lists and reducing load on the GPU by lowering the memory usage and reducing the processing time to improve efficiency and performance of the system.

OBJECTS OF THE PRESENT DISCLOSURE

A general object of the present disclosure is to provide three-dimensional geometric rendering of the objects using point cloud methods.

Another object of the present disclosure is to provide a single vertex list that holds all the plurality of points for rendering the point cloud without a need to allocate an additional vertex list.

Another object of the present disclosure is to provide the plurality of points to represent objects as a sample of points representative of, and located on, the external surface (interior-inclusive, or interior-exclusive) of the object.

Another object of the present disclosure is to provide changing the scene zoom/scaling level as a technique to change the distance from the camera (view position) to the objects represented by the rendered point cloud, and pertains to a method of point cloud rendering on GPU using dynamic point retention. Further, embodiments of the present disclosure can be easily adapted to make use of other techniques to change the distance from the camera (view position) to the objects represented by the rendered point cloud.

Another object of the present disclosure is to facilitate providing high quality rendering, upon the level of detail of the rendered object being controlled using dynamic point retention that is done by changing the vertex stride passed to the GPU based on scaling factor applied by a user.

SUMMARY

The present disclosure relates to systems and methods for maintaining a single vertex list for point cloud rendering on a Graphics Processing Unit (GPU) using dynamic point retention.

An aspect of the present disclosure relates to a system for maintaining a single vertex list for point cloud rendering on a Graphics Processing Unit (GPU) using dynamic point retention, comprising: one or more processors; one or more sampler units to control said one or more processors to acquire a plurality of points from external surfaces of respective one or more real-world objects to form a point cloud, wherein the plurality of points for rendering the point cloud are a set of vertices defined by X,Y,Z positions representing the one or more objects; an actual vertex stride unit to control said one or more processors to calculate size for each vertex; an initializer unit to control said one or more processors to initialize a single vertex list in the GPU, wherein the single vertex list is dynamically updated and appended regularly with the plurality of points of the point cloud acquired from the sampler units, and wherein while initializing the single vertex list, the GPU is allocated memory based on product of the total number of points obtained from the one or more sampler units and the size in bytes of each vertex; and a rendering unit to control said one or more processors to control and alter a Level of Detail (LOD) for the point cloud to be rendered, wherein the LOD for the rendered point cloud is controlled by retaining every $N^{th}$ point from the plurality of points present in the single vertex list, while skipping intermediate points from between the single vertex list.

According to an embodiment, the plurality of points of the point cloud are captured either from the sampler units within a maximum expected duration of point capture or are determined from the points of the point cloud stored in a file.

According to an embodiment, the value of N is dynamically selected from the points in the single vertex list to render the point cloud, while skipping intermediate points based on a determined zoom or scaling factor.

According to an embodiment, distance from a camera to the rendered point cloud is controlled by altering a scene scaling level.

According to an embodiment, distance from the camera to the rendered point cloud is controlled by changing Z axis position of the rendered scene's centre.

According to an embodiment, distance from the camera to the rendered point cloud is controlled by changing the Z axis position of the camera.

According to an embodiment, the value of N is an updated point retention factor.

According to an embodiment, the value of N has a lower value for rendering a denser scene and a higher value for rendering a sparse scene to control the LOD for the point cloud to be rendered.

According to an embodiment, the value of N is selected based on display quality requirement of the cloud point.

According to an embodiment, the size of each point cloud vertex, representing the X, Y, Z positions of a point, is measured in bytes.

According to an embodiment, the LOD for the rendered point cloud appears sparser as distance from camera to the rendered point cloud increases and denser as the distance from the camera to the rendered point cloud decreases.

According to an embodiment, anew batch of captured plurality of points for rendering the point cloud is appended at the end of the single vertex list.

According to an embodiment, updating the single vertex list with the new batch of the captured plurality of points for rendering the point cloud requires determining availability of the GPU memory.

According to an embodiment, to control the LOD at which the points are rendered, an updated size in bytes of each vertex is passed to the GPU, and wherein the updated size is computed as product of the calculated size in bytes of each vertex and the updated point retention factor.

Another aspect of the present disclosure relates to a method for maintaining a single vertex list for point cloud rendering on a Graphical Processing Unit (GPU) using dynamic point retention, including: acquiring, by one or more processors, a plurality of points from external surfaces of respective one or more real-world objects to form a point cloud, wherein the plurality of points for rendering the point cloud are a set of vertices defined by X,Y,Z positions representing the one or more objects; calculating, by the one or more processors, size for each vertex; initializing, by the one or more processors, a single vertex list in the GPU, wherein the single vertex list is dynamically updated and appended regularly with the plurality of the points, and wherein while initializing the single vertex list, the GPU is allocated memory based on product of the total number of points and the size in bytes of each vertex; and controlling and altering, by the one or more processors, a Level Of Detail (LOD) for the point cloud to be rendered, wherein the LOD for the rendered point cloud is controlled by retaining every Nth point from the plurality of points present in the single vertex list, while skipping the intermediate points from between the single vertex list.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

FIG. 5 is an exemplary diagram 500 showing a list of the plurality of the points for rendering the point cloud. The points in bold are the ones retained for rendering when point retention factor=3, in accordance with an embodiment of the present disclosure.

FIG. 6 is an exemplary diagram, 600 for depicting the vertex data for the plurality of the points. The points in bold are read by the GPU while the vertex data of the other points are ignored. When point retention factor=3, vertex stride passed to GPU=actual vertex stride of 12×point retention factor=36, in accordance with an embodiment of the present disclosure.

DETAILED DESCRIPTION

Figure 1:
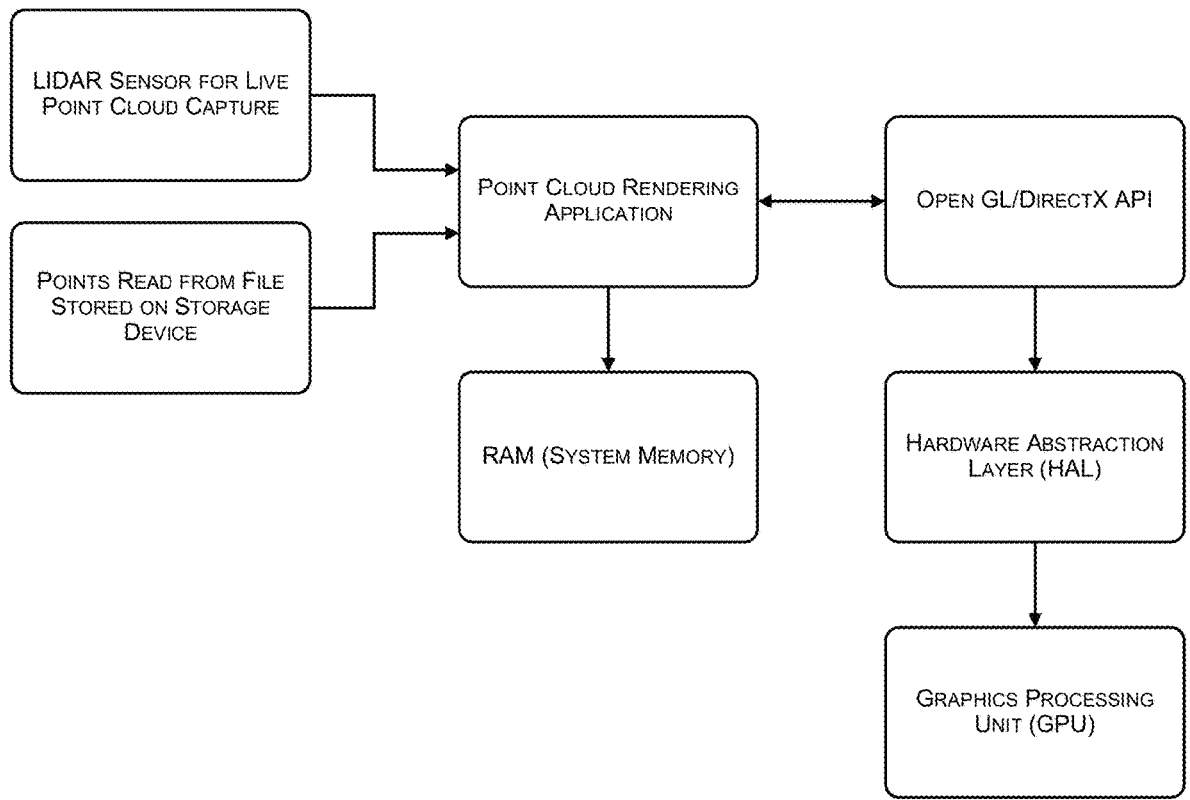
FIG. 1 illustrates a conventional technique for a point cloud rendering system.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates to systems and methods for maintaining a single vertex list for point cloud rendering on a Graphics Processing Unit (GPU) using dynamic point retention.

Rendering real-time three-dimensional computer models of physical real-world objects is made possible by making use of vertices and edges, which approximate the surface, texture and location of the real-world objects. These objects are stored in a computer medium as a collection of polygons which are collected together to form shape and visual characteristics of the encoded real-world object.

One of the methods of the three-dimensional model rendering is point cloud rendering, wherein the point cloud represent the objects not as a collection of polygons, but rather as a sample of points representative of, and located on, the external surface (interior-inclusive, or interior-exclusive) of the object. The point cloud is a set of vertices, often considerably large, having at least three-dimensional coordinates; these vertices are often defined by the classic 3-tuple (X, Y, Z) of three-dimensional rendering coordinates. They are generally rendered using the GPU (Graphics Processing Unit) for real time rendering.

For 2D/3D rendering using the point cloud method, sampling devices (E.g. LiDAR Sensor, Image Sensor) obtain a large number of the points from the external surface of a real-world object and output it as a point cloud array containing the vertices called as the vertex buffer or vertex list. In most cases, a batch of new point cloud vertices is appended at the end of the existing list of point vertices at regular intervals by capturing the points from the sampling devices. As the number of the points appended at the end of the vertices list keeps on increasing with time, it becomes difficult to render all the point vertices in real time especially using the mid-end on-board GPUs. Thus, when the scenes containing advanced geometry have to be rendered, the rendering complexity and performance are of utmost resource considerations, and should be managed carefully. For this purpose, object complexity is to be reduced which leads to improved performance.

A technique for reducing the object complexity in a given scene is to alter the level of detail of the objects. A Level of detail (LOD) commonly involves decreasing the complexity of the object representation as it moves away from the viewer. The efficiency of rendering is improved by decreasing the graphics system load, usually by reducing vertex transformations.

3D point clouds are a set of points represented in the 3D space, each associated with multiple attributes like coordinates and colour. They can be used to reconstruct a 3D object or a scene composing of various points. Point clouds can be captured using camera arrays and depth sensors, and may be made up to billions of points in order to represent reconstructed objects of high-quality.

Despite the promising nature of point clouds, these 3D media are highly resource intensive, and therefore are difficult to stream and render at acceptable quality levels.

Therefore, a major challenge is how to efficiently store the bulky high-quality point clouds in resource constrained graphic processors.

To solve the above recited and other available technical problems in the prior-art, the present disclosure alters the level of detail of the objects and renders all point vertices in real time using mid-end onboard GPUs. A single vertex list is created that contains and holds a large number of points for rendering the point cloud in real time. The plurality of points for rendering the point cloud are selected dynamically based on the zoom level.

To materialize the real time rendering and allowing the user to interact with the point cloud; transformations such as scaling, rotation and translation are applied, and it is necessary to control the LOD (Level of Detail) for the rendered point cloud by retaining every Nth point from the plurality of points for rendering, while skipping the points in between. This is done so that the point cloud appears sparser as the distance from the camera (view position) to the objects represented by the rendered point cloud increases, and denser as the distance from the camera (view position) to the objects represented by the rendered point cloud decreases (complexity level), since the user must be able to see a more detailed view of the objects represented by the point cloud as the distance from the camera to the objects represented by the rendered point cloud keeps on decreasing.

An aspect of the present disclosure relates to a system for maintaining a single vertex list for point cloud rendering on a Graphics Processing Unit (GPU) using dynamic point retention, comprising: one or more processors; one or more sampler units to control said one or more processors to acquire a plurality of points from external surfaces of respective one or more real-world objects to form a point cloud, wherein the plurality of points for rendering the point cloud are a set of vertices defined by X,Y,Z positions representing the one or more objects; an actual vertex stride unit to control said one or more processors to calculate size for each vertex; an initializer unit to control said one or more processors to initialize a single vertex list in the GPU, wherein the single vertex list is dynamically updated and appended regularly with the plurality of points of the point cloud acquired from the sampler units, and wherein while initializing the single vertex list, the GPU is allocated memory based on product of the total number of points obtained from the one or more sampler units and the size in bytes of each vertex; and a rendering unit to control said one or more processors to control and alter a Level of Detail (LOD) for the point cloud to be rendered, wherein the LOD for the rendered point cloud is controlled by retaining every $N^{th}$ point from the plurality of points present in the single vertex list, while skipping intermediate points from between the single vertex list.

According to an embodiment, the plurality of points of the point cloud are captured either from the sampler units within a maximum expected duration of point capture or are determined from the points of the point cloud stored in a file.

According to an embodiment, the value of N is dynamically selected from the points in the single vertex list to render the point cloud, while skipping intermediate points based on a determined zoom or scaling factor.

According to an embodiment, distance from a camera to the rendered point cloud is controlled by altering a scene scaling level.

According to an embodiment, distance from the camera to the rendered point cloud is controlled by changing Z axis position of the rendered scene's centre.

According to an embodiment, distance from the camera to the rendered point cloud is controlled by changing the Z axis position of the camera.

According to an embodiment, the value of N is an updated point retention factor.

According to an embodiment, the value of N has a lower value for rendering a denser scene and a higher value for rendering a sparse scene to control the LOD for the point cloud to be rendered.

According to an embodiment, the value of N is selected based on display quality requirement of the cloud point.

According to an embodiment, the size for each vertex is measured in bytes.

According to an embodiment, the LOD for the rendered point cloud appears sparser as distance from camera to the rendered point cloud increases and denser as the distance from the camera to the rendered point cloud decreases.

According to an embodiment, anew batch of captured plurality of points for rendering the point cloud is appended at the end of the single vertex list. According to an embodiment, updating the single vertex list with the new batch of the captured plurality of points for rendering the point cloud requires determining availability of the GPU memory.

According to an embodiment, to control the LOD at which the points are rendered, an updated size in bytes of each vertex is passed to the GPU, wherein the updated size is computed as product of the calculated size in bytes of each vertex and the updated point retention factor.

Another aspect of the present disclosure relates to a method for maintaining a single vertex list for point cloud rendering on a Graphical Processing Unit (GPU) using dynamic point retention, including: acquiring, by one or more processors, a plurality of points from external surfaces of respective one or more real-world objects to form a point cloud, wherein the plurality of points for rendering the point cloud are a set of vertices defined by X,Y,Z positions representing the one or more objects; calculating, by the one or more processors, size for each vertex; initializing, by the one or more processors, a single vertex list in the GPU, wherein the single vertex list is dynamically updated and appended regularly with the plurality of the points, and wherein while initializing the single vertex list, the GPU is allocated memory based on product of the total number of points and the size of each vertex in bytes; and; and controlling and altering, by the one or more processors, a Level Of Detail (LOD) for the point cloud to be rendered, wherein the LOD for the rendered point cloud is controlled by retaining every Nth point from the plurality of points present in the single vertex list, while skipping the intermediate points from between the single vertex list.

The technical benefits achieved by the implementation of various embodiments of the present disclosure are as recited below:

The present disclosure solves the above recited and other available technical problems by altering a level of detail of the objects and rendering all point vertices in real time using mid-end on-board GPUs. A single vertex list is created that can contain and hold the plurality of the points for rendering the point cloud. The plurality of points from the vertex list are selected to be rendered dynamically based on a determined zoom level.

Figure 2:
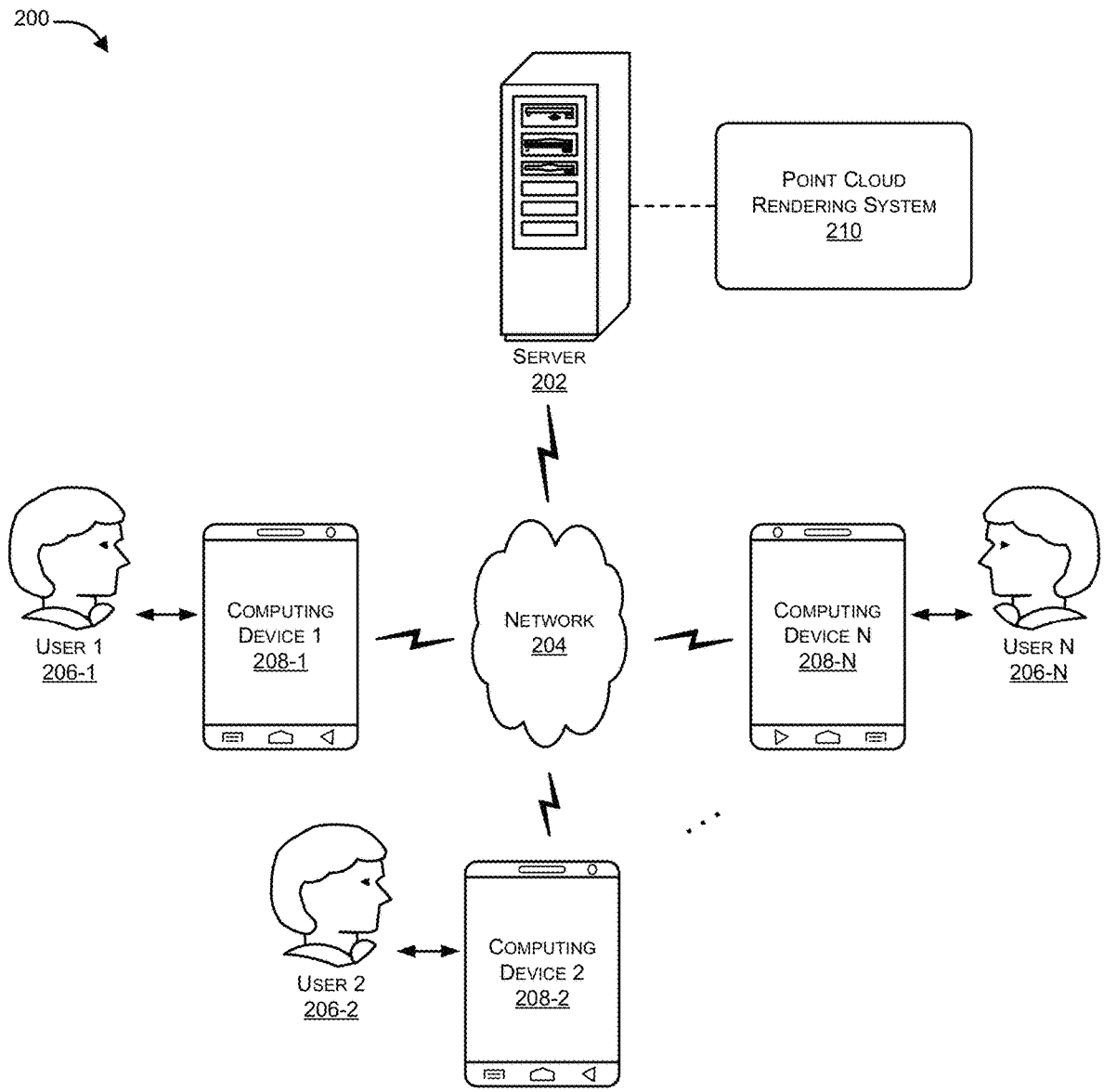
FIG. 2 illustrates exemplary implementation architecture 200 of a point cloud rendering system in accordance with an embodiment of the present disclosure.

FIG. 2 illustrates exemplary implementation architecture 200 of a point cloud rendering system in accordance with an embodiment of the present disclosure.

In an embodiment, the proposed system 210 is a point cloud rendering system for 3D geometric rendering of an object in different complexity levels. Although the present subject matter is explained considering that the system 210 is implemented as an application on a server 202, it may be understood that the point cloud rendering system 210 may also be implemented in a variety of computing systems, such as a laptop computer, a desktop computer, a notebook, a workstation, a server, a network server, a cloud-based environment and the like. It would be appreciated that the a point cloud rendering system 210 may be accessed by multiple users 206-1, 206-2 . . . 206-N (collectively referred to as users 206 and individually referred to as the user 206 hereinafter), through one or more computing devices 208-1, 208-2 . . . 208-N (collectively referred to as computing devices 208 hereinafter), or applications residing on the computing devices 208. In an aspect, the proposed a point cloud rendering system 210 can be operatively coupled to a website and are operable from any Internet enabled computing device 208. Examples of the computing devices 208 may include, but are not limited to, a portable computer, a personal digital assistant, a handheld device, and a workstation. The computing devices 208 are communicatively coupled to the proposed a point cloud rendering system 210 through a network 204. It may be also understood that the proposed point cloud rendering system 210 is a system for determining the efficiency of the data structures for performing various operations while receiving various size data sets.

In one implementation, the network 204 can be a wireless network, a wired network or a combination thereof. The network 204 can be implemented as one of the different types of networks, such as intranet, local area network (LAN), wide area network (WAN), the internet, and the like. Further, the network 206 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 204 can include a variety of network devices, including routers, bridges, servers, computing devices, storage devices, and the like.

As discussed, the computing device 208 (which may include multiple devices in communication in a hard-wired or wireless format) may include at least one of the following: a mobile wireless device, a smartphone, a mobile computing device, a wireless device, a hard-wired device, a network device, a docking device, a personal computer, a laptop computer, a pad computer, a personal digital assistant, a wearable device, a remote computing device, a server, a functional computing device, or any combination thereof. While, in one preferred and non-limiting embodiment, the primary computing device 108 is a smartphone (which may include the appropriate hardware and software components to implement the various described functions), it is also envisioned that the computing device 108 be any suitable computing device configured, programmed, or adapted to perform one or more of the functions of the described system.

Figure 3:
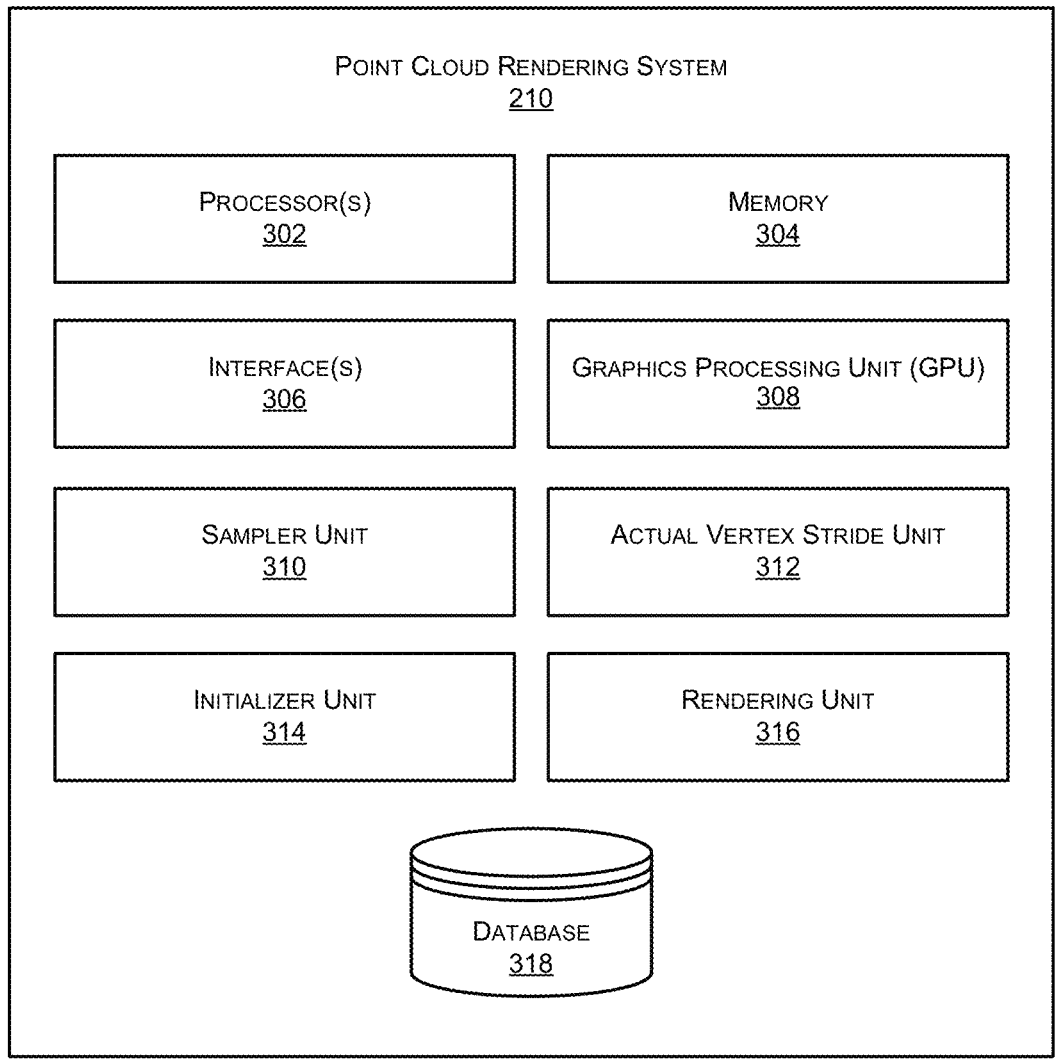
FIG. 3 illustrates an exemplary module diagram 300 of the point cloud rendering system in accordance with an embodiment of the present disclosure.

FIG. 3 illustrates an exemplary module diagram 300 of the point cloud rendering system in accordance with an embodiment of the present disclosure.

In an aspect, the system 210 may comprise one or more processor(s) 302. The one or more processor(s) 302 may be implemented as one or more microprocessors, microcomputers, microcontrollers, digital signal processors, central processing units, logic circuitries, and/or any devices that manipulate data based on operational instructions. Among other capabilities, the one or more processor(s) 302 are configured to fetch and execute computer-readable instructions stored in a memory 304 of the system 210. The memory 304 may store one or more computer-readable instructions or routines, which may be fetched and executed to create or share the data units over a network service. The memory 304 may comprise any non-transitory storage device including, for example, volatile memory such as RAM, or non-volatile memory such as EPROM, flash memory, and the like.

The system 210 may also comprise an interface(s) 306. The interface(s) 306 may comprise a variety of interfaces, for example, interfaces for data input and output devices, referred to as I/O devices, storage devices, and the like. The interface(s) 306 may facilitate communication of system 210 with various devices coupled to the system 210 such as the input unit and the output unit. The interface(s) 306 may also provide a communication pathway for one or more components of the system 210. Examples of such components include, but are not limited to, a sampler unit 310, an actual vertex stride unit 312, an initializer unit 314, a rendering unit 316, a graphics processing unit 308 and database 318. It would be appreciated that, the database 318 of the system 210 can be configured at a remote location say a cloud or a server.

In an embodiment of the present disclosure, the GPU is a specialized electronic circuit designed to rapidly manipulate and alter the memory to accelerate creation of images for outputting to a display.

In an aspect of the present disclosure, the sampler unit 310 can be configured to acquire the plurality of the points, for rendering he point cloud, from external surfaces of respective one or more real-world objects. The point cloud can be a set of vertices that are defined by classic 3-tuple (X, Y, Z) of three-dimensional rendering coordinates, which is generally rendered using the GPU for real time rendering.

In an aspect, the plurality of the points can be accessed by scanning surfaces of the real world objects. The point cloud is obtained by visible access to real objects regardless of the technique of acquisition (scanner or photos). It is difficult to obtain the points on the object's surfaces that are not visible from the position from which we collect data. Thus to cover all dimensions of the objects there is a need to combine many scanning positions.

In an aspect, the actual vertex stride unit 312 is configured to calculate the size of each vertex.

In an aspect, the initializer unit 314 is configured to initialize a single vertex list in the GPU. The single vertex list is dynamically updated and appended regularly with the plurality of the points used for rendering the point cloud. A new batch of the captured plurality of the points is appended at the end of the single vertex list.

In an aspect, the rendering unit 316 is configured to control and alter control the LOD at which the points are rendered. The LOD for the rendered point cloud appears sparser as distance from a camera to the rendered point cloud increases and denser as the distance from the camera to the rendered point cloud decreases.

In an embodiment, the point cloud system can interact with commonly used GPU, based rendering API, such as OpenGL 2.0 and DirectX 9.0c that interact with the HAL (Hardware Abstraction Layer),which in turns issues commands to the GPU. In an embodiment, various techniques discussed with reference to the component block diagram may be implemented using higher versions of OpenGL (such as OpenGL 3.x, OpenGL 4.x and Vulkan) as well as DirectX (such as DirectX 10.x, DirectX 11.x and DirectX 12.x).

Figure 4:
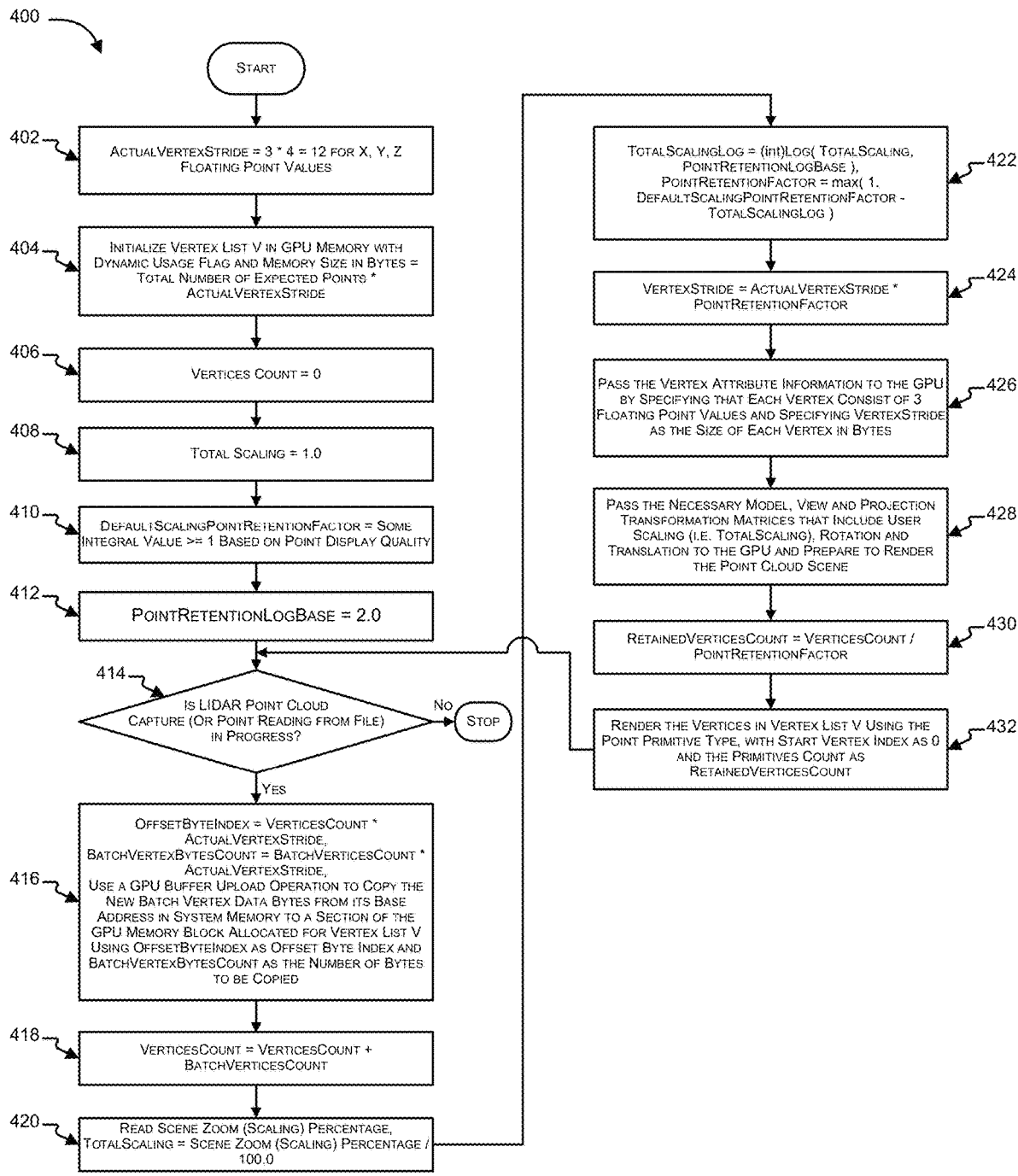
FIG. 4 illustrates an exemplary process flow diagram 400 for the point cloud rendering on the GPU using dynamic point retention in accordance with embodiments of the present disclosure.

FIG. 4 illustrates an exemplary process flow diagram 400 for the point cloud rendering on the GPU using dynamic point retention in accordance with embodiments of the present disclosure.

At block 402, the size in bytes of each vertex is calculated, where 3×4=12 bytes are used for storing the X, Y, Z floating point positions of each point. The result can be stored as an integral value (say ActualVertexStride).

At block 404, a single vertex list (vertex array/vertex buffer) (say V) is created in GPU memory that is capable of being updated dynamically. This vertex list shall be used for storing the X, Y, Z floating point 3D vertex positions of each point. The number of vertices (points) in the vertex list must be decided based on the total number of points that can be captured using the sampler units like the LIDAR sensor within the maximum expected duration of point capture, or by reading the count of points stored in a file located on a storage device if live capture of points is not being done. Hence, the total amount of GPU memory allocated while initializing the vertex list shall be equal to the product of the total number of expected points and the size in bytes of each vertex (i.e. Actual Vertex Stride).

At block 406, count of vertices (say Vertices Count) can be initialized that represents the total number of vertices currently updated in vertex list V to 0.

At block 408, initialize the zoom (say Total Scaling) at which the scene will be initially rendered to the floating point value of 1.0 representing 100% X, Y, Z axis scaling is performed (i.e. a scaling factor that represents percentage based scaling divided by 100.0). The user may make use of some form of user interface to later increment/decrement the value of Total Scaling to zoom in/zoom out of the scene while rendering.

At block 410, initialize an integral value greater than or equal to 1 for the default point retention factor (say Default Scaling Point Retention Factor) that will allow points that are multiples of Default Scaling Point Retention Factor to be retained (selected) for rendering from the vertex list V, while skipping the points in between, at the default scaling of 100% i.e. point indices 0, Default Scaling Point Retention Factor×1, Default Scaling Point Retention Factor×2, . . . will be retained for rendering, while skipping the intermediate points.

In an embodiment, the value may be selected based on the point display quality required, where Default Scaling Point Retention Factor must be a lower value for rendering a denser scene, and a higher value for rendering a sparser scene at the default scaling of 100%. For e.g. Default Scaling Point Retention Factor=15, 10, and 5 can be chosen for Low, Medium and High quality respectively, and this value must be updated whenever the quality setting changes.

At block 412, the base of the mathematical logarithm is initialized for later calculating the updated point retention factor (say Point Retention LogBase) to the floating point value 2.0.

At block 414, when a new batch of vertex points (captured by a LIDAR sensor or read from a file stored on a storage device) are ready to be rendered in addition to the previously rendered vertices, the new batch vertex points are appended at the end of the vertex list V. This is done by a GPU buffer upload operation that copies all the new batch vertex data bytes from its base address in RAM (system memory) to a section of the GPU memory block allocated for vertex list V.

In an embodiment, before implementing the buffer upload operation described above, a check must be made to see if the new batch of vertex points can be completely appended in the available block of GPU memory allocated for vertex list V, and if not, then the algorithm is stopped.

In an embodiment, if the new batch of vertex points can be completely appended in the available block of GPU memory allocated for vertex list V, at block 416, the offset byte index (say Offset Byte Index) with respect to the GPU memory block allocated for the vertex list V at which the memory copy starts is determined by calculating the product of the Vertices Count and the Actual Vertex Stride. The number of bytes to be copied (say Batch Vertex Bytes Count) is the product of the count of the new batch vertex points (say the Batch Vertices Count) and the Actual Vertex Stride.

At block 418, the Vertices Count is set to the sum of the Vertices Count and the Batch Vertices Count.

At block 420, the current value for the scene zoom (scaling) percentage set by the user is read, divided by 100.0 and assigned the floating point result to Total Scaling.

At block 422, the determined Total Scaling value is used to establish a correlation between the scene zoom and the point retention factor (say Point Retention Factor) that will allow points that are multiples of the Point Retention Factor to be dynamically retained (selected) for rendering from the vertex list V, while skipping the points in between, at the current zoom (scaling) set by the user i.e. point indices 0, the Point Retention Factor×1, the Point Retention Factor×2, . . . will be retained for rendering, while skipping the intermediate points.

Figure 5:
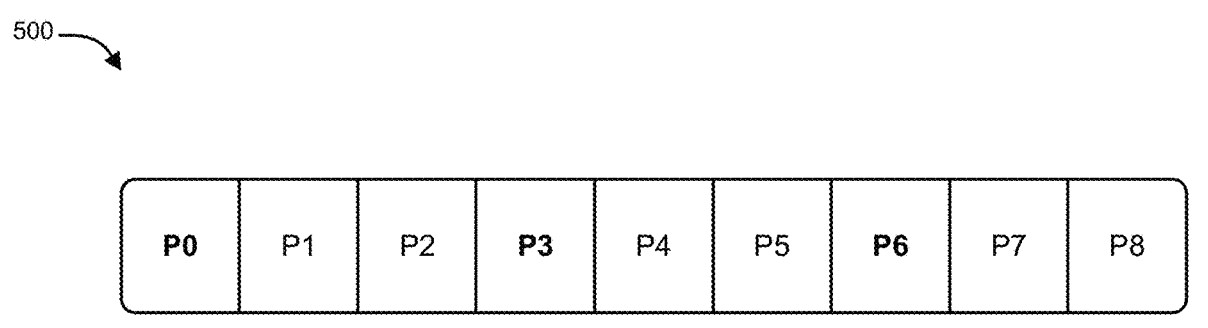

FIG. 5 is an exemplary diagram 500 showing a list of the plurality of the points for rendering the point cloud. The points in bold are the ones retained for rendering when Point Retention Factor=3, in accordance with an embodiment of the present disclosure.

In an aspect, this is done by calculating the mathematical logarithm of Total Scaling to the base Point Retention Log Base, and storing it as an integral value (say Total Scaling Log). The value of Total Scaling Log is then subtracted from Default Scaling Point Retention Factor and assigned to Point Retention Factor. If the value of Point Retention Factor is less than the minimum allowed value of 1, it is set to 1.

In an aspect, using this approach the value of the Point Retention Factor decreases as the scene scaling increases, and vice-versa to control the LOD at which the points are rendered. The mathematical function should be chosen such that to allow the value of Point Retention Factor to decrease slowly as the scene scaling increases to prevent it from becoming equal to the minimum allowed value of 1 too quickly (where no points are skipped while rendering), and allow the user to visualize all points without skipping any points only at very high zoom levels. Rendering the more number of points while skipping a lesser number of the points to represent a denser scene as the zoom level increases still allows a decent rendering speed to be achieved since a smaller area of the scene is visualized at higher zoom levels, thereby allowing the GPU to clip the vertices that are not visible in the viewing frustum.

In an aspect, since Point Retention Log Base is initially selected as 2.0, it means the value of Point Retention Factor will decrease by 1 each time the scene is scaled to 200% of the previous scaling at which the Point Retention Factor had changed i.e. at 200%, 400% . . . and so on. Similarly, the Point Retention Factor will increase by 1 when scaling is reduced to 50% of the previous scaling at which the Point Retention Factor had changed 50%, 25% . . . and so on. At scaling of 100%, Point Retention Factor shall be equal to Default Scaling Point Retention Factor.

In an aspect, instead of selecting Point Retention Log Base as 2.0, a slightly lower value such as 1.5 may be initially selected to allow the Point Retention Factor to decrease more quickly by 1 at 150%, 225% . . . and so on. Also, instead of using mathematical logarithm to control Point Retention Factor, some other mathematical function may also be used for e.g. when Total Scaling is greater than 1.0, it may be converted to an integral value and subtracted from Default Scaling Point Retention Factor, and the result may be assigned to Point Retention Factor, which would allow Point Retention Factor to decrease by 1 each time the scaling changes to 200%, 300% and so on.

In an aspect, instead of establishing a correlation between the scene zoom (which controls the distance of the camera (view position) to the objects represented by the rendered point cloud) and the Point Retention Factor to control the LOD at which the points are rendered, the function may be adapted to make use of one of the other already mentioned methods such as but not limited to: 1) changing the scene zoom/scaling level (i.e. applying scaling to the world transformation matrix uniformly about X, Y, Z axis), 2) changing the Z axis position of the rendered scene's centre (i.e. applying translation to the world transformation matrix along Z axis), and 3) changing the Z axis position of the camera (i.e. changing the eye Z axis position while constructing the view transformation matrix).

At block 424, instead of using the Actual Vertex Stride to represent the number of bytes required to hold each of the point's vertex data while rendering, store the product of the Actual Vertex Stride and the Point Retention Factor as an integral value (say the Vertex Stride).

At block 426, the vertex attribute information is passed to the GPU by specifying that each of the vertex consists of 3 floating point values, and specifying the Vertex Stride as the size of each vertex in bytes.

In an aspect, the value of the Vertex Stride instead of the Actual Vertex Stride is passed as the number of bytes per vertex to the GPU to control the LOD at which the points are rendered. This allows the GPU to read the vertex data for the X, Y, Z floating point positions of the first point in the vertex list V starting from byte offset 0, after which the GPU increments the byte offset by a value of Vertex Stride to read the next retained point's vertex data and so on, thereby allowing only those points that are multiples of Point Retention Factor to be retained for rendering, while skipping the points in between.

In an embodiment, when multiple point data sources exist like multiple lasers in the LIDAR sensor with different vertical orientation angles, then the mentioned function is to be used separately for each of the point data source by segregating the points into the separate vertex lists to allow the points from each of the source to be retained in a uniform manner.

FIG. 6 is an exemplary diagram, 600 for depicting the vertex data for the plurality of the points. The points in bold are read by the GPU while the vertex data of the other points are ignored. When point retention factor=3, vertex stride passed to GPU=actual vertex stride of 12×point retention factor=36, in accordance with an embodiment of the present disclosure.

At block 428, pass the necessary model, view and projection transformation matrices that include user scaling (i.e. the Total Scaling), rotation and translation to the GPU and prepare to render the point cloud scene using the fixed or programmable pipeline with shaders.

In an aspect, while rendering the point cloud, the color assigned to each of the point may be correlated to the point elevation (i.e. Z position) above the ground, or some other coloring scheme may also be employed.

At block 430, the Vertices Count is divided by the Point Retention Factor and is stored as an integral value (say Retained Vertices Count) for representing the number of point primitives to be rendered.

At block 432, the vertices in vertex list V are rendered using the Point primitive type, with start vertex index as 0 and the primitives count as Retained Vertices Count.

The steps from block 414 to block 432 are repeated until the live point cloud of the objects capture is not stopped in case of the LIDAR sensor, or reading of points from the file stored on the storage device is not stopped, else the execution of the function is stopped.

In an aspect, the discussed function maintains only a single vertex list for containing all the plurality of the points for rendering the point cloud and then selects points for rendering dynamically based on the determined zoom level. Although the function describes the use of the zoom/scaling level as the technique for changing the distance from the camera (view position) to the objects represented by the rendered point cloud, it can easily be adapted to make use of the other available methods for doing the same.

Figure 7:
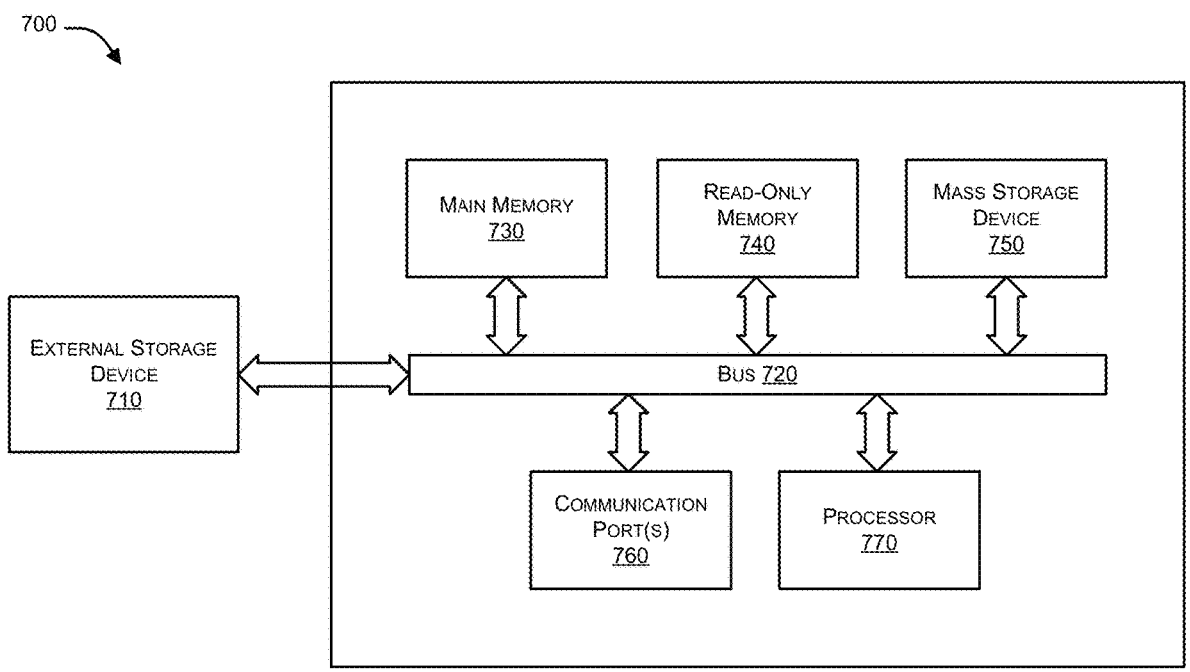
FIG. 7 illustrates an exemplary computer system, 700 in which or with which embodiments of the present disclosure can be utilized, in accordance with embodiments of the present disclosure.

As shown in FIG. 7, computer system includes an external storage device 710, a bus 720, a main memory 730, a read only memory 740, a mass storage device 750, communication port 760, and a processor 770. A person skilled in the art will appreciate that computer system may include more than one processor and communication ports. Examples of processor 770 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 770 may include various modules associated with embodiments of the present disclosure. Communication port 760 can be any of an RS-232 port for use with a modem-based dialup connection, a 10/100 Ethernet port, a Gigabit or 10 Gigabit port using copper or fibre, a serial port, a parallel port, or other existing or future ports. Communication port 760 may be chosen depending on a network, such a Local Area Network (LAN), Wide Area Network (WAN), or any network to which computer system connects.

Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g., start-up or BIOS instructions for processor 770. Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such as a front side bus (FSB), which connects processor 770 to software system.

Optionally, operator and administrative interfaces, e.g. a display, keyboard, and a cursor control device, may also be coupled to bus 720 to support direct operator interaction with computer system. Other operator and administrative interfaces can be provided through network connections connected through communication port 760. External storage device 710 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE PRESENT DISCLOSURE

The present disclosure provides a technique where the GPU memory is allocated only for the single vertex list, and the list holds the plurality of the points for rendering the point cloud without a need to allocate an additional vertex list for controlling the LOD of the point cloud while rendering. Thereby, time and processing power is needed only for copying points to a single vertex list in GPU memory.

The present disclosure provides a technique that facilitates providing high quality rendering performance, upon the level of detail of the rendered object being controlled using dynamic point retention that is done by changing the vertex stride passed to the GPU based on scaling factor applied by a user.

I claim:

1. A system for maintaining a single vertex list for point cloud rendering on a Graphics Processing Unit (GPU) using dynamic point retention, comprising:
    one or more processors;
    one or more sampler units to control said one or more processors to acquire a plurality of points from external surfaces of respective one or more real-world objects, wherein the plurality of points are a set of vertices defined by X,Y,Z positions representing the one or more objects;
    an actual vertex stride unit to control said one or more processors to calculate size in bytes for each vertex in the set of vertices of the plurality of points;
    an initializer unit to control said one or more processors to initialize a single vertex list in the GPU, wherein the single vertex list is dynamically updated and appended with the plurality of points acquired from the sampler units during a capture period, and wherein while initializing the single vertex list, the GPU is allocated memory based on the size in bytes of each vertex in the set of vertices of the plurality of points; and
    a rendering unit to control said one or more processors to control and alter a point-cloud level of detail for a point cloud to be rendered, wherein the LOD for the point cloud to be rendered is controlled by retaining every Nth point from the plurality of points present in the single vertex list, while skipping intermediate points from the single vertex list;
    wherein to control the point-cloud level of detail for the point cloud to be rendered, an updated size of each vertex in bytes is passed to the GPU, where the updated size is computed as a product of the calculated size of each vertex in bytes and an updated point retention factor,
    wherein N is the updated point retention factor.

2. The system of claim 1, wherein the plurality of points are captured either from the sampler units within a maximum expected duration of point capture or are read from a file.

3. The system of claim 1, wherein N is dynamically selected based on a determined zoom or scaling factor.

4. The system of claim 1, wherein distance from a camera to the point cloud to be rendered is controlled by altering a scene scaling level.

5. The system of claim 1, wherein distance from a camera to the point cloud to be rendered is controlled by changing Z axis position of a rendered scene's centre.

6. The system of claim 1, wherein distance from a camera to the point cloud to be rendered is controlled by changing a Z axis position of the camera.

7. The system of claim 1, wherein N is selected based on display quality requirement of the point cloud to be rendered.

8. The system of claim 1, wherein the point-cloud level of detail for the rendered point cloud to be rendered appears sparser as distance from a camera to the point cloud to be rendered increases and denser as the distance from the camera to the point cloud to be rendered decreases.

9. The system of claim 1, wherein a new batch of the acquired plurality of points is appended at an end of the single vertex list.

10. The system of claim 9, wherein updating the single vertex list with the new batch of the acquired plurality of points requires determining availability of the GPU memory.

11. A method for maintaining a single vertex list for point cloud rendering on a Graphical Processing Unit (GPU) using dynamic point retention, includes:
    acquiring, by one or more processors, a plurality of points from external surfaces of respective one or more real-world objects, wherein the plurality of points are a set of vertices defined by X,Y,Z positions representing the one or more objects;
    calculating, by the one or more processors, size in bytes for each vertex in the set of vertices of the plurality of points;
    initializing, by the one or more processors, a single vertex list in the GPU, wherein the single vertex list is dynamically updated and appended regularly with the plurality of the points acquired from the sampler units, and wherein while initializing the single vertex list, the GPU is allocated memory based on the size in bytes of each vertex in the set of vertices of the plurality of points; and
    controlling and altering, by the one or more processors, a point-cloud level of detail for the point cloud to be rendered, wherein the point-cloud level of detail for the point cloud to be rendered is controlled by retaining every Nth point from the plurality of points present in the single vertex list, while skipping the intermediate points from the single vertex list; wherein to control the point-cloud level of detail at which the point cloud to be rendered is rendered, an updated size of each vertex in bytes is passed to the GPU, where the updated size is computed as a product of the calculated size of each vertex in bytes and an updated point retention factor, wherein N is the updated point retention factor.

* * * * *